United States Patent
Murata et al.

(10) Patent No.: US 9,614,194 B2
(45) Date of Patent: Apr. 4, 2017

(54) BATTERY

(71) Applicant: Kabushiki Kaisha Toshiba, Minato-ku (JP)

(72) Inventors: Masahiro Murata, Saku (JP); Kengo Kurata, Saku (JP); Akira Yajima, Saku (JP); Hiroshi Watanabe, Saku (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 335 days.

(21) Appl. No.: 14/025,997

(22) Filed: Sep. 13, 2013

(65) Prior Publication Data

US 2014/0079983 A1 Mar. 20, 2014

(30) Foreign Application Priority Data

Sep. 14, 2012 (JP) .................. 2012-203402

(51) Int. Cl.

| H01M 4/64 | (2006.01) |
|---|---|
| H01M 4/00 | (2006.01) |
| H01M 2/02 | (2006.01) |
| H01M 2/06 | (2006.01) |
| H01M 2/26 | (2006.01) |

(Continued)

(52) U.S. Cl.
CPC ......... *H01M 2/02* (2013.01); *H01M 2/0202* (2013.01); *H01M 2/0237* (2013.01); *H01M 2/06* (2013.01); *H01M 2/26* (2013.01); *H01M 2/0275* (2013.01); *H01M 2/0287* (2013.01); *H01M 2/266* (2013.01); *H01M 10/0413* (2013.01); *H01M 10/0431* (2013.01); *H01M 10/0525* (2013.01); *H01M 10/0587* (2013.01); (Continued)

(58) Field of Classification Search
CPC ..................................... H01M 10/02
See application file for complete search history.

(56) References Cited

U.S. PATENT DOCUMENTS

| 6,743,546 B1 | 6/2004 | Kaneda et al. |
| 2007/0207378 A1 | 9/2007 | Mizuta |

(Continued)

FOREIGN PATENT DOCUMENTS

| CN | 1527417 A | 9/2004 |
| CN | 1560956 A | 1/2005 |

(Continued)

OTHER PUBLICATIONS

Office Action issued Jun. 23, 2015 in European Patent Application No. 13 184 295.7.

(Continued)

*Primary Examiner* — Jacob Marks
(74) *Attorney, Agent, or Firm* — Oblon, McClelland, Maier & Neustadt, L.L.P.

(57) ABSTRACT

According to one embodiment, a battery includes an electrode group, at least one positive electrode current collector tab, at least one negative electrode current collector tab, and a case. The case includes a case portion and an edge portion. The edge portion includes a heat sealed part configured to seal the case portion and a non-sealed part. The electrode group is housed in the case portion while an end portion of at least one of the positive electrode current collector tab and the negative electrode current collector tab is provided in the non-sealed part.

14 Claims, 7 Drawing Sheets

(51) Int. Cl.
  *H01M 10/04* (2006.01)
  *H01M 10/0525* (2010.01)
  *H01M 10/42* (2006.01)
  *H01M 10/0587* (2010.01)

(52) U.S. Cl.
  CPC .... *H01M 2010/4292* (2013.01); *H01M 2220/20* (2013.01); *Y02E 60/122* (2013.01); *Y02T 10/7011* (2013.01)

(56) References Cited

U.S. PATENT DOCUMENTS

| | | | |
|---|---|---|---|
| 2009/0263712 A1 | 10/2009 | Mizuta et al. | |
| 2012/0313570 A1* | 12/2012 | Ohtaniuchi | H01M 10/0525 320/103 |
| 2013/0078507 A1 | 3/2013 | Mizuta et al. | |

FOREIGN PATENT DOCUMENTS

| | | |
|---|---|---|
| CN | 1830114 A | 9/2006 |
| CN | 101405894 A | 4/2009 |
| CN | 201877524 U | 6/2011 |
| EP | 1 202 371 A1 | 5/2002 |
| EP | 1 734 596 A1 | 12/2006 |
| EP | 1 826 843 A1 | 8/2007 |
| EP | 2 006 935 A1 | 12/2008 |
| JP | 2001-76706 | 3/2001 |
| JP | 2003-142067 | 5/2003 |
| JP | 4300172 | 4/2009 |
| JP | 2009-187558 A | 8/2009 |
| JP | 2012-109124 | 6/2012 |
| JP | 2012-129114 | 7/2012 |
| WO | WO2005/086258 | 9/2005 |
| WO | WO2007/105541 | 9/2007 |

OTHER PUBLICATIONS

Shriram Santhanagopalan et al., "Chapter 5—Separators for Lithium-Ion Batteries", Lithium-Ion Batteries: Advanced Materials and Technologies, Jan. 1, 2011, XP055195568, ISBN: 978-1-43-984129-7, pp. 197-251, Retrieved from the Internet: URL:http://www.crcnetbase.com/doilpdf/10.1201/b11292-6.
Communication pursuant to Article 94(3) EPC issued Jan. 8, 2015 in European Patent Application No. 13 184 295.7.
Extended European Search Report issued on Nov. 27, 2013 in the corresponding European Application No. 13184295.7.
Combined Office Action and Search Report issued May 6, 2015 in Chinese Patent Application No. 201310418226.9 (with English language translation).
Combined Chinese Office Action and Search Report issued Jan. 19, 2016 in Patent Application No. 201310418226.9 (with English translation of categories of cited documents).
Office Action mailed Jun. 21, 2016 in Japanese Patent Application No. 2012-203402 (with English Translation).

* cited by examiner

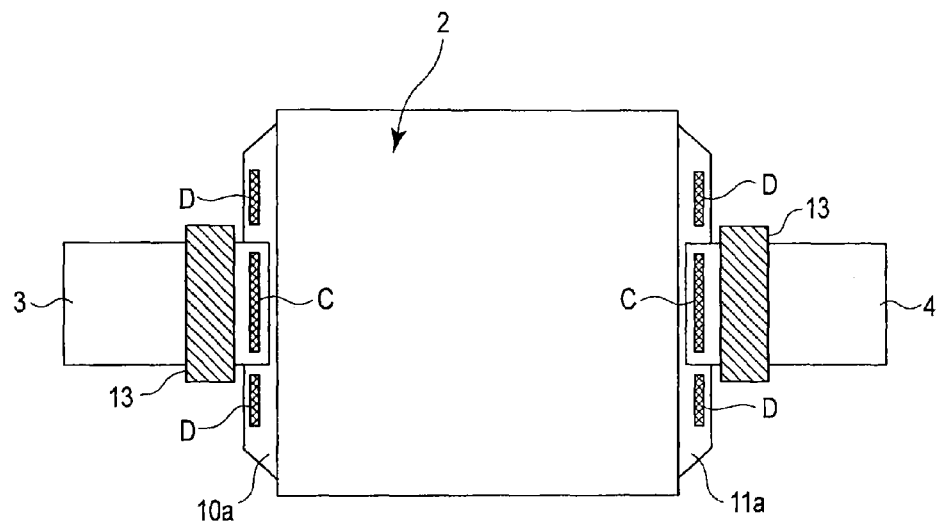
F I G. 10
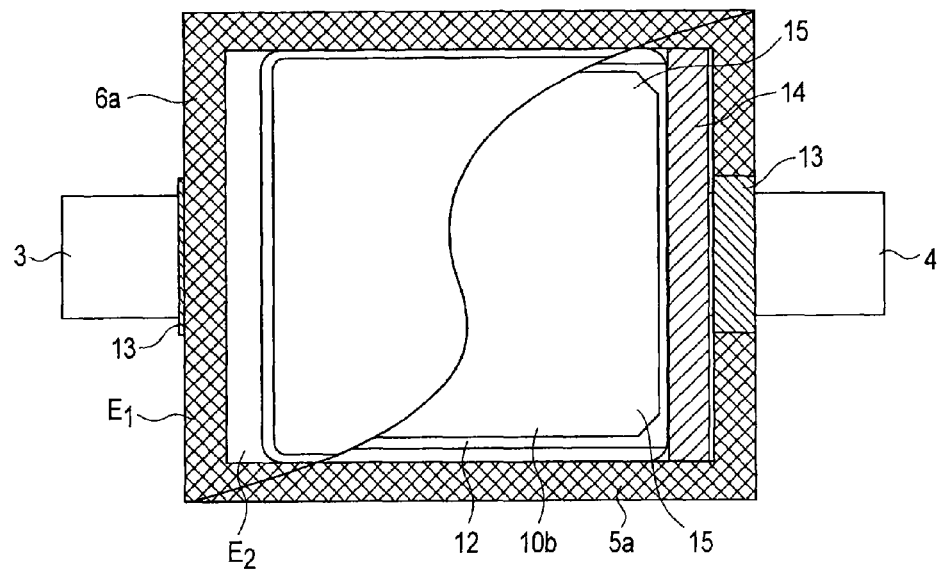
F I G. 11

BATTERY

CROSS-REFERENCE TO RELATED APPLICATIONS

This application is based upon and claims the benefit of priority from Japanese Patent Application No. 2012-203402, filed Sep. 14, 2012, the entire contents of which are incorporated herein by reference.

FIELD

Embodiments described herein relate to generally to a battery.

BACKGROUND

In recent years, a lithium ion battery has been widely developed as a power supply of an electric vehicle, an electric motorcycle, a forklift, an automatic guided vehicle, an uninterrupted power supply (UPS) unit, a power storage facility, an emergency electric power supply unit, and the like. In response to such a trend, it is desirable to develop a lithium ion battery having a large scale, a large capacity, a high output power, and a low resistance. Meanwhile, in order to guarantee a cycle life over 10 years, for example, it is desirable to provide a structure sufficiently endurable to vibration or impact even in a large scale. As a casing of the battery, typically, a metal can or a casing made of an aluminum-containing laminate film may be employed. The laminate film casing is applied to a large-scaled battery or a thin battery because it guarantees freedom in shaping and does not necessitate an expensive mold unlike a metal can.

The lithium ion battery comprising the laminate film casing has also been developed as a power supply for use in the fields described above. However, the lithium ion battery comprising the laminate film casing is susceptible to vibration or impact because it does not have sufficient rigidity compared to the metal can.

BRIEF DESCRIPTION OF THE DRAWINGS

FIG. 10 is an enlarged plan view illustrating the electrode group of the battery of FIG. 9 before an insulating member is coated;

FIG. 11 is a plan view schematically illustrating a battery according to a fifth embodiment;

DETAILED DESCRIPTION

According to an embodiment, there is provided a battery including an electrode group, a case, a positive electrode lead, and a negative electrode lead. The electrode group includes a positive electrode including an active material-containing layer, a negative electrode including an active material-containing layer, a separator interposed between the positive and negative electrodes, at least one positive electrode current collector tab projecting from one end portion of the electrode group, and at least one negative electrode current collector tab projecting from the other end portion of the electrode group. The case includes a case portion configured to house the electrode group and an edge portion which includes a heat sealed part configured to seal the case portion and a non-sealed part. A positive electrode lead is electrically connected to the at least one positive electrode current collector tab, and an end portion thereof extends outwardly through the edge portion of the case. A negative electrode lead is electrically connected to the at least one negative electrode current collector tab, and an end portion thereof extends outwardly through the edge portion of the case. The electrode group is housed in the case portion while an end portion of at least one of the at least one positive electrode current collector tab and the at least one negative electrode current collector tab is provided in the non-heat-sealed part.

Hereinafter, embodiments will be described with reference to the accompanying drawings.

First Embodiment

According to a first embodiment, a battery includes an electrode group, a case, a positive electrode lead, and a negative electrode lead.

Figure 1A:
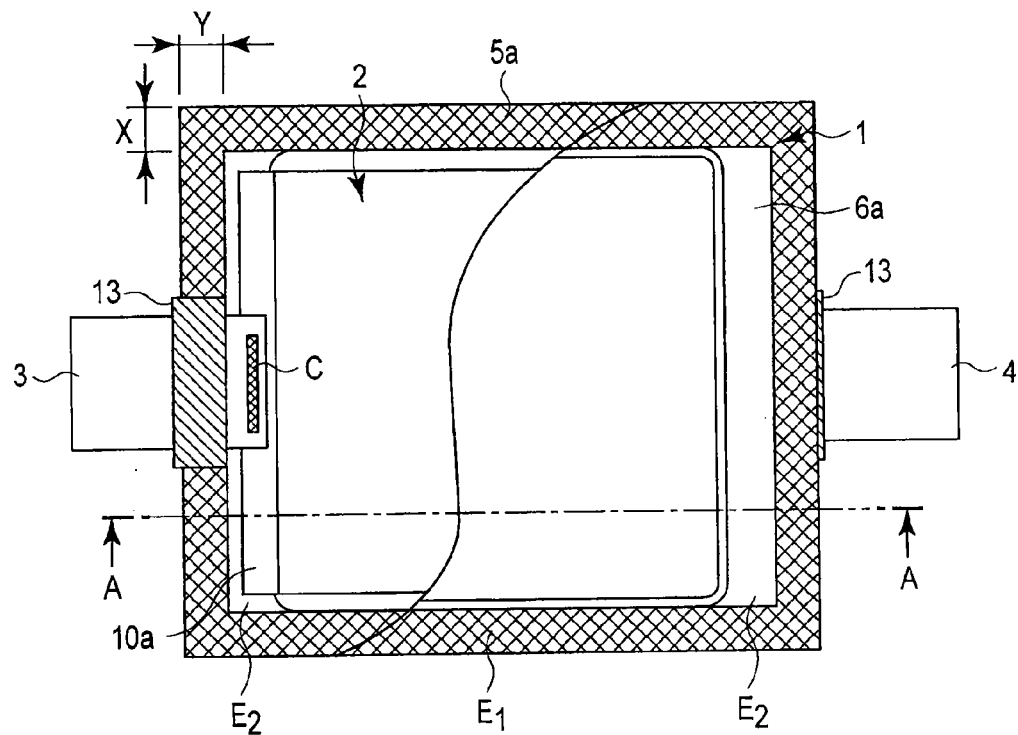
FIG. 1A is a plan view schematically illustrating a battery according to a first embodiment.
Figure 1B:
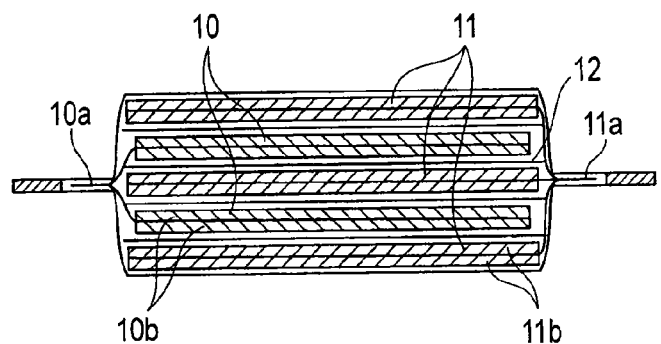
FIG. 1B is a cross-sectional view obtained by cutting the battery of FIG. 1A along a line A-A.
Figure 2:
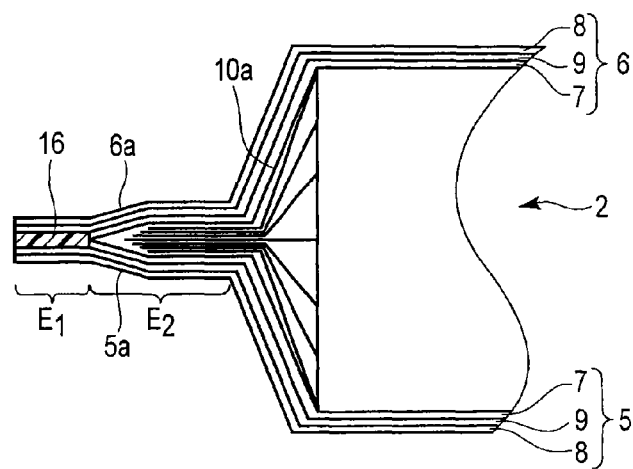
FIG. 2 is an enlarged cross-sectional view schematically illustrating main parts of the battery of FIG. 1B.
Figure 3:
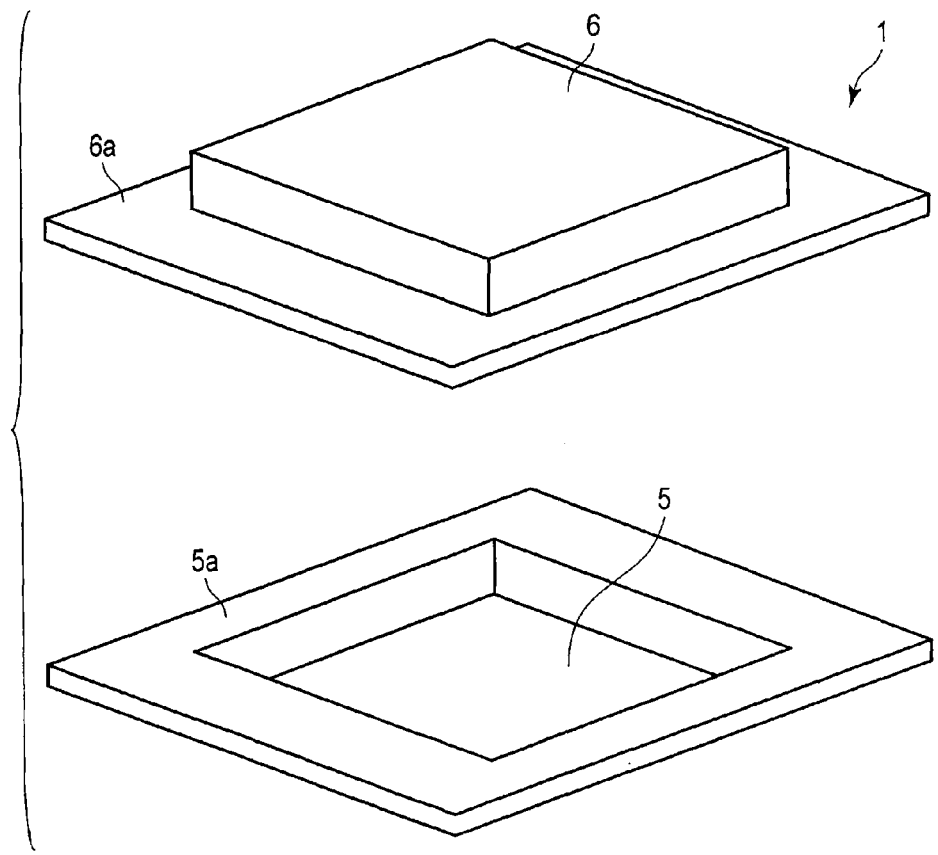
FIG. 3 is a perspective view illustrating a case used in the battery of FIGS. 1A and 1B.
Figure 4:
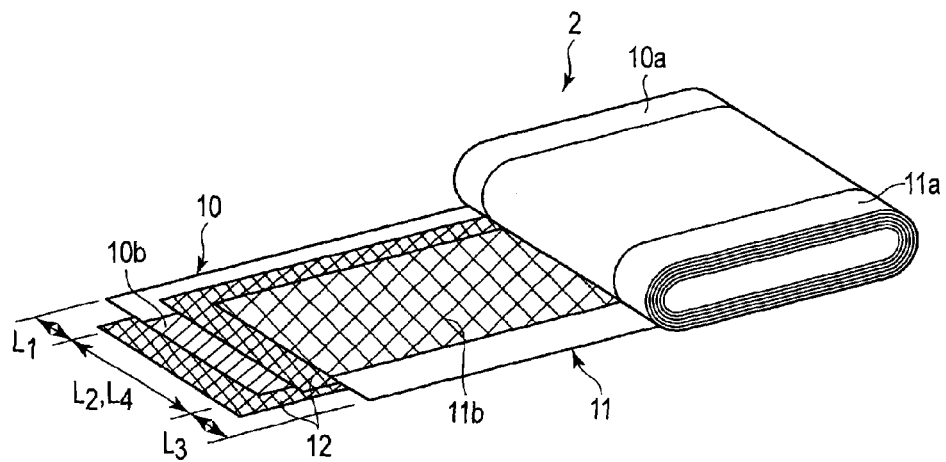
FIG. 4 is a perspective view illustrating an electrode group partially exploded and used in the battery of FIGS. 1A and 1B.

The battery according to the first embodiment will be described with reference to FIGS. 1A to 4. FIG. 1A is a plan view schematically illustrating the battery according to the first embodiment, in which the case is partially exploded. FIG. 1B is a cross-sectional view obtained by cutting the battery of FIG. 1A along a line A-A. FIG. 2 is an enlarged cross-sectional view schematically illustrating main parts of the battery of FIG. 1B. FIG. 3 is a perspective view illustrating the case used in the battery of FIGS. 1A and 1B. FIG. 4 is a perspective view illustrating a state that the electrode group used in the battery of FIGS. 1A and 1B is partially exploded.

The battery of FIGS. 1A and 1B is a nonaqueous electrolyte battery (for example, a lithium ion secondary battery). This nonaqueous electrolyte battery includes a case 1, an electrode group 2, a positive electrode lead 3, a negative electrode lead 4, and a nonaqueous electrolyte (not illustrated). As illustrated in FIG. 3, the case 1 includes a first film comprising a first convex portion 5 overhanging outwardly in a rectangular shape and a second film comprising a second convex portion 6 overhanging outwardly in a rectangular shape. The first and second convex portions 5 and 6 of the first and second films are formed, for example, by performing deep drawing, for example, on a laminate film. A portion extending approximately horizontally around an opening end of the first convex portion 5 is an edge portion 5a, and a portion extending approximately horizontally around an opening end of the second convex portion 6 is an edge portion 6a. If the edge portion 5a of the first film and the edge portion 6a of the second film are bonded through heat sealing, a space enveloped by the first and second convex portions 5 and 6 is sealed. Therefore, the electrode group can be housed in this space. That is, a portion formed by the first and second convex portions 5 and 6 serves as a case portion. As illustrated in FIG. 2, for example, the laminate film may include a sealant layer 7, a resin layer 8 and a metal layer 9 interposed between the sealant layer 7 and the resin layer 8. Since the sealant layer forms an inner surface of the case 1, the edge portions 5a and 6a can be bonded through heat sealing. Examples of a material for the sealant layer 7 include a thermoplastic resin such as polypropylene (PP) or polyethylene (PE). Examples of the metal layer 9 include an aluminum foil and an aluminum alloy foil. In addition, the resin layer 8 is provided to insulate and protect the metal layer 9. Examples of a material for the resin layer 8 include polymers such as nylon or polyethylene terephthalate (PET). For example, examples of the aluminum-containing laminate film may include a layered structure of nylon/aluminum/polyethylene and a layered structure of nylon/aluminum/polypropylene. A polyethylene terephthalate layer may be provided on an outer side of the nylon layer.

As illustrated in FIG. 4, the electrode group 2 is obtained by spirally winding the positive electrode 10, the negative electrode 11, and the separator 12 interposed therebetween in a flat shape. The positive electrode 10 includes, for example, a positive electrode current collector made of a metal foil in a strip shape, a positive electrode current collector tab 10a parallel to a long side of the positive electrode current collector, and a positive electrode active material layer 10b formed in the positive electrode current collector except for at least a part corresponding to the positive electrode current collector tab 10a. Meanwhile, the negative electrode 11 includes a negative electrode current collector made of a metal foil in a strip shape, a negative electrode current collector tab 11a parallel to a long side of the negative electrode current collector, and a negative electrode active material layer 11b formed in the negative electrode current collector except for at least a part corresponding to the negative electrode current collector tab 11a.

The positive electrode 10, the separator 12, and the negative electrode 11 are wound by deviating the positions of the positive electrode 10 and the negative electrode 11 such that the positive electrode current collector tab 10a projects from the separator 12 in a winding axis direction of the electrode group, and the negative electrode current collector tab 11a projects from the separator 12 in a direction opposite to the positive electrode current collector tab projecting direction. Through such winding, in the electrode group 2, the positive electrode current collector tab 10a projects from one end face relative to the negative electrode 11 and the separator 12 while it is rolled in a spiral shape as illustrated in FIG. 1. Meanwhile, from the other end face, the negative electrode current collector tab 11a projects relative to the positive electrode 10 and the separator 12 while it is rolled in a spiral shape. A width in a direction perpendicular to the projecting direction of each of the positive and negative electrode current collector tabs 10a and 11a is equal to the width of the electrode group 2. The nonaqueous electrolytic solution (not illustrated) is impregnated into the electrode group 2.

The positive electrode current collector tab 10a is spirally wound, and the end portion of the positive electrode current collector tab 10a overlap each other and are electrically connected to each other. The overlappingly connected end portion of the positive electrode current collector tab 10a is connected to an end portion of the positive electrode lead 3. In FIG. 1A, the connecting portion is denoted by reference symbol "C". In addition, the negative electrode current collector tab 11a is spirally wound, and the end portion of the negative electrode current collector tab 11a overlap each other and are electrically connected to each other. The overlappingly connected end portion of the negative electrode current collector tab 11a is connected to an end portion of the negative electrode lead 4. The connecting between the positive electrode current collector tab 10a and the positive electrode lead 3 and the connecting between the negative electrode current collector tab 11a and the negative electrode lead 4 are performed, for example, through ultrasonic welding, laser welding, resistance welding, and the like.

As illustrated in FIG. 1A, the edge portion 5a of the first film of the case 1 is overlappingly bonded to the edge portion 6a of the second film so that electrode group 2 is housed in the case portion formed by the first and second convex portions 5 and 6. The positive electrode current collector tab 10a is arranged in one of four sides formed by overlappingly bonding the edge portions 5a and 6a of the first and second films, and the end portion of the positive electrode lead 3 extends outwardly through this one side. Similarly, the negative electrode current collector tab 11a is arranged in the side opposite to this one side, and the end portion of the negative electrode lead 4 extends outwardly through this opposite side in a direction opposite to that of the positive electrode lead 3. Each of the positive and negative electrode current collector tabs 10a and 11a is arranged between the edge portion 5a of the first film and the edge portion 6a of the second film. As illustrated in FIG. 1A, one strip-like thermoplastic insulation film 13 is arranged on a heat-sealed portion of each side of the positive electrode lead 3a, and the other strip-like thermoplastic insulation film 13 is arranged on a heat-sealed portion of each side of the negative electrode lead 4. The thermoplastic insulation film 13 may include, for example, a film containing polyolefins modified with acids.

The edge portion 5a of the first film and the edge portion 6a of the second film are bonded through heat sealing. Heat sealing the edge portions 5a and 6a is performed while an internal space of the case is depressurized or vacuumized, after electrolytic solution injection. The heat-sealing width of the edge portion where the positive and negative electrode leads 3 and 4 are heat-sealed is equal to width Y. The heat-sealing width of other edge portions is equal to width X. In FIG. 1A, the heat-sealed portion E1 in the edge portions 5a and 6a is hatched. The positive and negative electrode leads 3 and 4 are heat-sealed on inner surfaces of the edge portions 5a and 6a with a width Y by interposing the thermoplastic insulation film 13. In the heat-sealed portion E1 indicated by width Y, a bonding portion 16 where the sealant layers 7 are bonded to each other through heat sealing is formed as illustrated in FIG. 2. In the edge portion where the positive and negative electrode leads 3 and 4 are heat-sealed, a portion located inwardly from the heat-sealed portion E1 of width Y is a non-heat-sealed portion E2 where heat sealing is not performed. The end portions of the positive electrode current collector tab 10a and the negative electrode current collector tab 11a are interposed between the edge portions 5a and 6a in the non-heat-sealed portion E2 while the end portions of the positive electrode current collector tab 10a and the negative electrode current collector tab 11a are fixed to the positive electrode lead 3 and the negative electrode lead 4, respectively. As a result, the end portions of the positive electrode current collector tab 10*a* and the negative electrode current collector tab 11*a* are directly nipped from the non-heat-sealed portion of the case 1, and the atmospheric pressure from the outside is applied to the case 1. For this reason, when the nonaqueous electrolyte battery is used as in-vehicle equipment or in a forklift, and strong vibration is applied to the battery, it is possible to suppress a deviation of the electrode position and avoid a crack or fracture in the positive electrode current collector tab 10*a* and the negative electrode current collector tab 11*a*. As a result, it is possible to suppress battery internal resistance increase due to vibration or impact applied to the battery.

Materials of the positive and negative electrode current collectors and the positive and negative electrode current collector tabs are preferably selected depending on a type of the employed active material. In a case where a carbon-based material is used in the negative electrode active material, for example, aluminum or aluminum alloy is used in the positive electrode current collector and the positive electrode current collector tab, and a metal such as copper, nickel, or nickel-plated iron is used in the negative electrode current collector and the negative electrode current collector tab. In addition, in a case where lithium titanate is used in the negative electrode active material, examples of the materials for the negative electrode current collector and the negative electrode current collector tab may include a metal such as copper, nickel, nickel-plated iron, aluminum or aluminum alloy.

Materials of the positive and negative electrode leads 3 and 4 are not particularly limited. The positive and negative electrode leads 3 and 4 are preferably made of the same material as those of the positive and negative electrode current collector tabs 10*a* and 11*a*. For example, in a case where the current collector tab is made of aluminum or aluminum alloy, the lead is preferably made of aluminum or aluminum alloy. In addition, in a case where the current collector tab is made of copper, the lead is preferably made of copper and the like.

Although description has been exemplarily made for a coil type electrode group in FIGS. 1A and 1B, the shape of the electrode group is not particularly limited thereto. For example, a stack type electrode group obtained by alternately stacking the positive electrode, the negative electrode, and the separator interposed therebetween may be employed. In the case of the stack type, a plurality of positive electrode current collector tabs project from one end face of the electrode group, and a plurality of negative electrode current collector tabs project from the other end face. In this manner, if the positive and negative electrode current collector tabs project from an end face of the electrode group in a spiral shape, or a plurality of tabs project in the case of the stack type, it is possible to provide a structure resistant to vibration and impact.

According to the first embodiment, an end portion of at least one of the positive electrode current collector tab and the negative electrode current collector tab is provided in a non-heat-sealed part of the edge portion of the case. Therefore, it is possible to suppress a deviation of the electrode when vibration or impact is applied to the battery and suppress a crack or fracture of the current collector tab. As a result, it is possible to suppress internal resistance increase when the battery is used while vibration or impact is applied to the battery.

Second Embodiment

Figure 5:
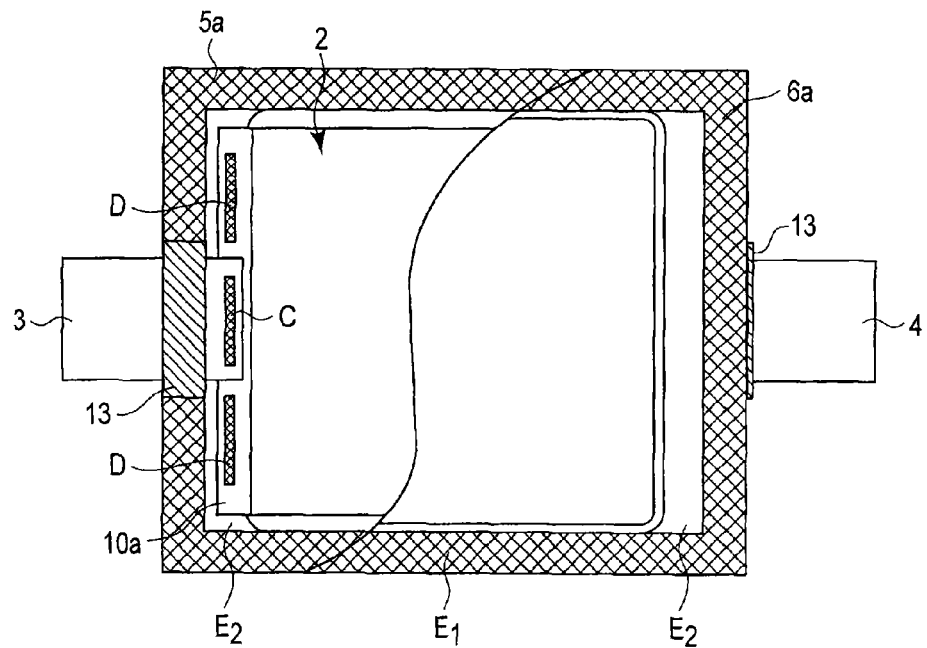
FIG. 5 is a plan view schematically illustrating a battery according to a second embodiment.

A battery according to a second embodiment will be described with reference to FIG. 5. FIG. 5 is a plan view schematically illustrating the battery according to the second embodiment, in which a case is partially exploded. In FIG. 5, like reference numbers denote like elements as in FIGS. 1A to 4, and description thereof will not be repeated. A nonaqueous electrolyte battery of FIG. 5 has the same structure as that of FIGS. 1A to 4 except for the first and second current collector tab connecting portions D. The first current collector tab connecting portion D is a portion where the positive electrode current collector tabs 10*a* are overlappingly connected to each other in a plurality of portions (for example, two portions) located on both sides of the connecting portion C for the positive electrode lead 3 of the positive electrode current collector tab 10*a*. Meanwhile, the second current collector tab connecting portion D is a portion where the negative electrode current collector tabs 11*a* are connected to each other in a plurality of portions (for example, two portions) located on both sides of the connecting portion C for the negative electrode lead 4 of the negative electrode current collector tab 11*a*. The bonding between the current collector tabs is performed, for example, through ultrasonic welding, laser welding, resistance welding, and the like.

Since the nonaqueous electrolyte battery of FIG. 5 has the connecting portion D where each of the positive and negative electrode current collector tabs 10*a* and 11*a* is overlappingly connected in addition to the connecting portion C where the positive and negative electrode leads 3 and 4 and the positive and negative electrode current collector tabs 10*a* and 11*a* are connected, it is possible to further increase an effect of suppressing a deviation of the electrode position when vibration or impact is applied to the nonaqueous electrolyte battery. As a result, it is possible to further suppress internal resistance increase due to vibration or impact applied to the battery. In addition, since the positive and negative electrode current collector tabs 10*a* and 11*a* projecting in a spiral shape are compressed in a stacking direction (thickness direction) in the connecting portion D, it is possible to reduce a total thickness of the positive and negative electrode current collector tabs 10*a* and 11*a*. Therefore, it is possible to easily arrange the end portions of the positive and negative electrode current collector tabs 10*a* and 11*a* on the edge portion 5*a* of the case portion 5.

In addition, according to the second embodiment, the current collector tab where the first and second current collector tab connecting portions D are formed may be any one of the positive electrode and the negative electrode.

According to the second embodiment, since at least one of the positive electrode current collector tab and the negative electrode current collector tab has a portion where the current collector tabs are connected to each other, it is possible to further suppress a deviation of the electrode when vibration or impact is applied to the battery. Therefore, it is possible to suppress internal resistance increase due to vibration or impact applied to the battery. In addition, since the current collector tab projecting from an end portion of the electrode group in a spiral shape or a plurality of tabs projecting in the case of the stack type is/are fixed to the connecting portion in a stacking direction, it is possible to reduce a total thickness of overall layers of the current collector tab(s). Therefore, it is possible to easily arrange the end portion of the current collector tab in a non-heat-sealed part of the edge portion of the case.

Third Embodiment

Figure 6:
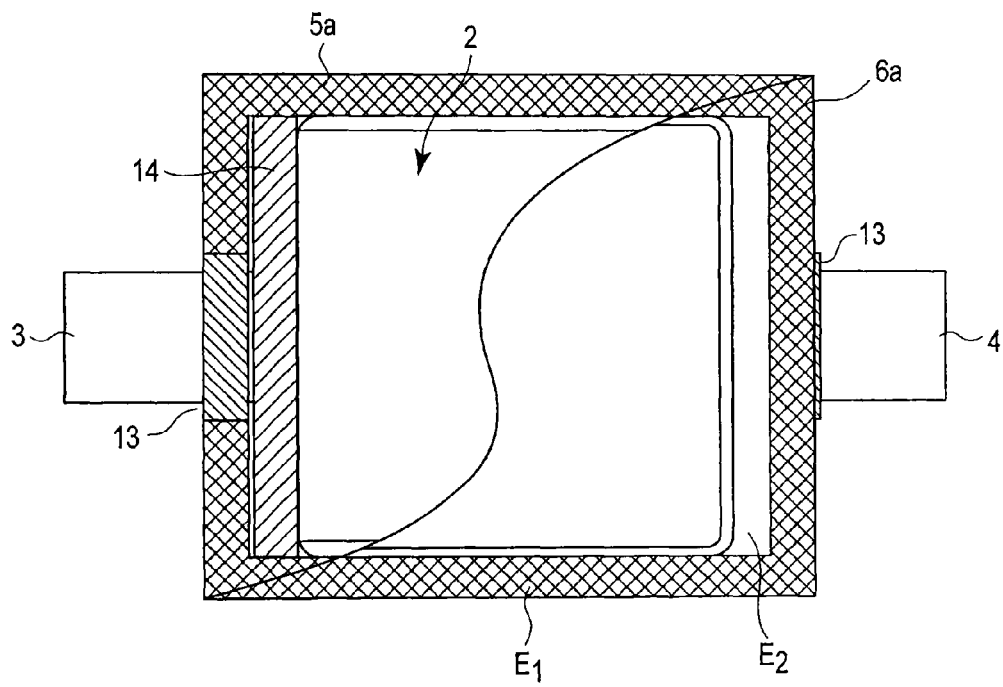
FIG. 6 is a plan view schematically illustrating a battery according to a third embodiment.

A battery according to a third embodiment will be described with reference to FIG. 6. FIG. 6 is a plan view schematically illustrating the battery according to the third embodiment, in which a case is partially exploded. A nonaqueous electrolyte battery of FIG. 6 has the same structure as that of FIGS. 1A to 5 except that an insulating member is employed.

A first insulating member 14 having a strip shape is coated on an outer circumference of a positive electrode current collector tab 10a exposed from a separator and is interposed between an inner surface of the case and the positive electrode current collector tab 10a. In addition, a second insulating member 14 (not illustrated) having a strip shape is coated on an outer circumference of the negative electrode current collector tab 11a exposed from the separator and is interposed between the negative electrode current collector tab 11a and an inner surface of the case. For example, an insulation tape (such as a polypropylene tape or a polyethylene terephthalate [PET] tape) may be used as the insulating member 14.

In this manner, if a portion of the positive electrode current collector tab 10a and the negative electrode current collector tab 11a exposed from the separator is covered by the insulating member, it is possible to prevent the positive electrode and the negative electrode from making contact with the metal layer 9 and avoid a possibility of an internal short-circuit even when a sealant layer 7 of a laminate film of the case is melt or cracked, and a metal layer 9 of the laminate film is exposed.

As illustrated in FIG. 6, in a case where a separator 12 is positioned in the outermost layer of the electrode group 2, it is possible to further improve an effect of preventing an internal short-circuit and facilitate a work for housing the electrode group 2 in the case 1 by coating a range from an end portion of the separator 12 to an end portion of the positive electrode current collector tab 10a, a range from an end portion of the separator 12 to an end portion of the negative electrode current collector tab 11a, or both the ranges with the insulating member 14.

According to the third embodiment, the insulating member 14 may be arranged on the positive and negative electrode current collector tabs 10a and 11a without forming the first and second current collector tab connecting portions D. In addition, the current collector tab coated with the insulating member 14 may be any one of the positive electrode or the negative electrode.

According to the third embodiment, since the insulating member is interposed between the end portion of at least one of the positive electrode current collector tab and the negative electrode current collector tab and the inner surface of the case, it is possible to prevent a possibility of a short-circuit between the positive and negative electrodes by interposing a metal layer even when a sealant layer on an inner surface of the case is melt or cracked, and the metal layer of the case is exposed.

Fourth Embodiment

Figure 7:
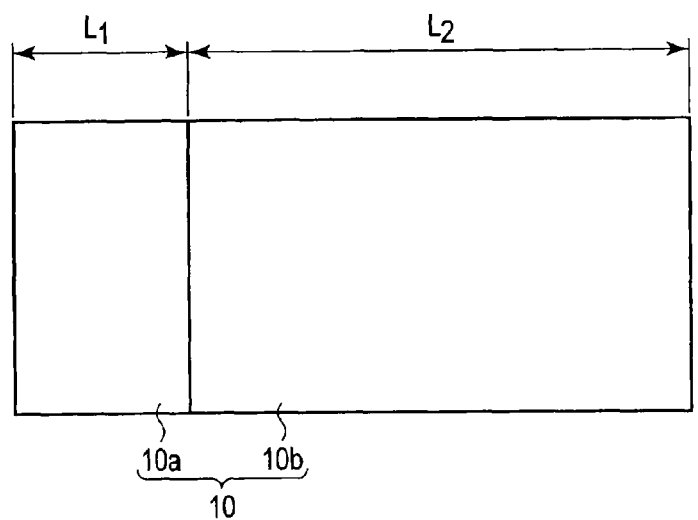
FIG. 7 is a plan view illustrating a positive electrode used in the battery according to a fourth embodiment.
Figure 8:
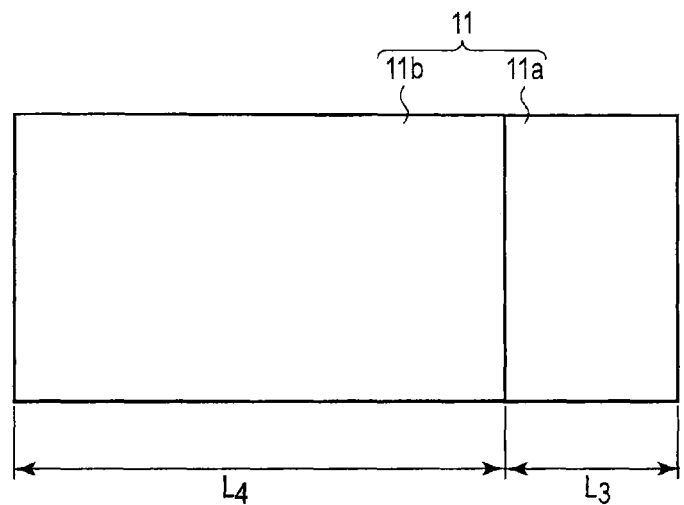
FIG. 8 is a plan view illustrating a negative electrode used in the battery according to the fourth embodiment.
Figure 9:
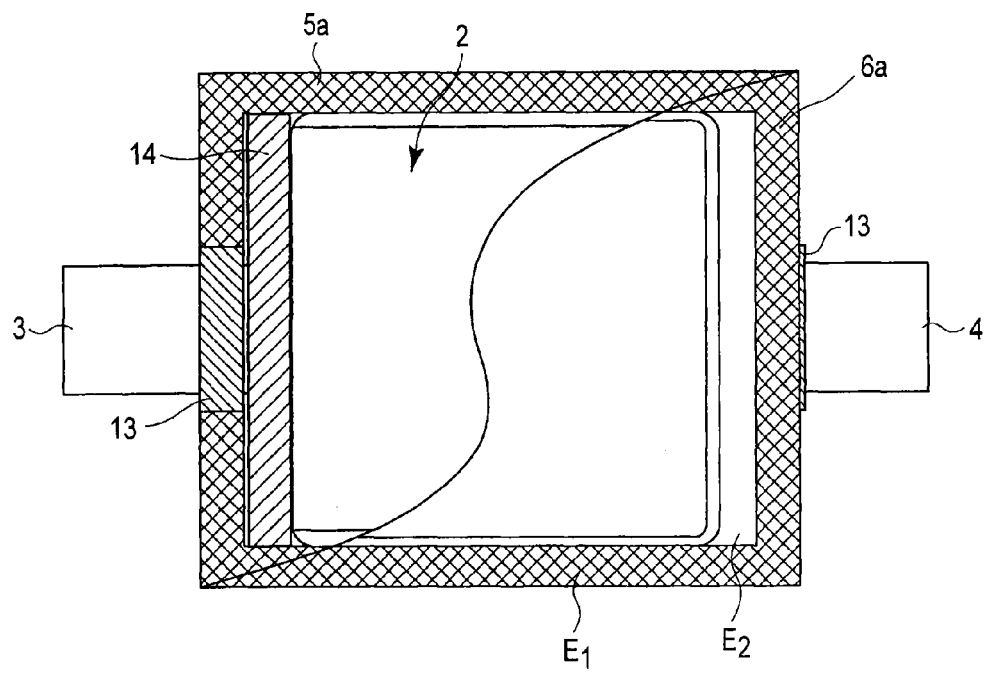
FIG. 9 is a plan view schematically illustrating the battery according to the fourth embodiment.

A battery according to a fourth embodiment will be described with reference to FIGS. 7 to 10. FIG. 7 is a plan view illustrating a positive electrode used in an electrode group of the battery according to the fourth embodiment, and FIG. 8 is a plan view illustrating a negative electrode used in the electrode group of the battery according to the fourth embodiment. FIG. 9 is a plan view schematically illustrating the battery according to the fourth embodiment, in which a case is partially exploded. FIG. 10 is an enlarged plan view illustrating a state before the electrode group of the battery of FIG. 9 is coated with an insulating member. In FIGS. 7 to 10, like reference numbers denote like elements as in FIGS. 1A to 6, and description thereof will not be repeated. A nonaqueous electrolyte battery of FIG. 9 has the same structure as that of FIG. 6 except that a stack type electrode group is employed. The stack type electrode group is manufactured using a positive electrode 10 of FIG. 7 and a negative electrode 11 of FIG. 8. As illustrated in FIG. 7, the positive electrode 10 includes, for example, a positive electrode current collector made of a metal foil in a rectangular sheet shape, a positive electrode current collector tab 10a being one end portion parallel to a short side of the positive electrode current collector, and a positive electrode active material layer 10b formed on at least one surface of the positive electrode current collector except for at least a portion corresponding to the positive electrode current collector tab 10a. Similarly, as illustrated in FIG. 8, the negative electrode 11 includes, for example, a negative electrode current collector made of a metal foil in a rectangular sheet shape, a negative electrode current collector tab 11a being one end portion parallel to the short side of the negative electrode current collector, and a negative electrode active material layer 11b formed on at least one surface of the negative electrode current collector except for at least a portion corresponding to the negative electrode current collector tab 11a.

The stack type electrode group 2 is manufactured by alternately stacking the positive electrode 10, the negative electrode 11, and the separator 12 interposed therebetween. As illustrated in FIG. 1B, a plurality of positive electrode current collector tabs 10a project relative to the negative electrode 11 and the separator 12 from one of both end portions of the electrode group 2. Meanwhile, a plurality of negative electrode current collector tabs 11a project relative to the positive electrode 10 and the separator 12 from the other end portion in the opposite side.

As described in the first embodiment, the positive electrode current collector tab 10a and the negative electrode current collector tab 11a are directly nipped into the case 1, and the first and second current collector tab connecting portions D are formed as described in the second embodiment.

As illustrated in FIG. 10, in each of the positive electrode current collector tabs 10a, the corner portions in both sides are C-chamfered to provide a trapezoidal shape as a whole. Similarly, in each of the negative electrode current collector tabs 11a, the corner portions in both sides are C-chamfered to provide a trapezoidal shape as a whole.

If the positive electrode current collector tab 10a and the negative electrode current collector tab 11a are coated with the insulating member 14 having a strip shape as illustrated in FIG. 9, it is possible to easily cover the positive electrode current collector tab 10a and the negative electrode current collector tab 11a by the insulating member 14 without exposing the positive electrode current collector tab 10a and the negative electrode current collector tab 11a, because the widths in a direction perpendicular to the projecting direction of the positive electrode current collector tab 10a and the negative electrode current collector tab 11a are smaller than the width of the insulating member 14.

According to the fourth embodiment, the insulating member 14 may be arranged on the positive and negative electrode current collector tabs 10a and 11a without forming the first and second current collector tab connecting portions D. In addition, the current collector tab coated with the insulating member 14 may be any one of the positive and the negative electrodes. Furthermore, the current collector tab having the R-shaped or chamfered corner portion may be any one of the positive and the negative electrodes.

According to the fourth embodiment, the corner portion in the end portion of at least one of the positive electrode current collector tab and the negative electrode current collector tab is notched or chamfered. Therefore, it is possible to facilitate a work for covering the surface of the end portion with the insulating member.

Fifth Embodiment

A battery according to a fifth embodiment will be described with reference to FIG. 11. FIG. 11 is a plan view schematically illustrating the battery according to the fifth embodiment, in which the case is partially exploded. In FIG. 11, like reference numbers denote like elements as in FIGS. 1A to 10, and description thereof will not be repeated. A nonaqueous electrolyte battery of FIG. 11 has the same structure as that of FIG. 9 except that a corner portion of a positive electrode is notched.

Areas of positive and negative electrodes and a separator are not particularly limited. As illustrated in FIG. 11, in a case where a relationship is established as below:

$$\alpha < \beta < \gamma$$

wherein $\alpha$ is an area of active material-containing layer 10b of positive electrode 10, $\beta$ is an area of active material-containing layer 11b of negative electrode 11, and $\gamma$ is an area of separator 12, a pair of corner portions 15 of the active material-containing layer 10b of the positive electrode 10 having the smallest area are preferably R-shaped or chamfered. As a result, when the electrode is deviated, or the corner portion 15 of the positive electrode 10 is deformed due to vibration or impact applied to the battery, it is possible to prevent an internal short-circuit by preventing the corner portion 15 of the positive electrode 10 from tearing the separator 12.

A relationship between the area of the positive electrode active material-containing layer and the area of the negative electrode active material-containing layer may be set as follows. For example, in a case where a carbon-based material is used in the negative electrode active material, the area of the negative electrode active material-containing layer is preferably set to be larger than the area of the positive electrode active material-containing layer. In addition, in a case where lithium titanate is used in the negative electrode active material, the area of the negative electrode active material-containing layer may be set to be smaller than the area of the positive electrode active material-containing layer. Alternatively, the area of the negative electrode active material-containing layer may be set to be larger than the area of the positive electrode active material-containing layer.

According to the fifth embodiment, the area of the active material-containing layer of the positive electrode is different from the area of the active material-containing layer of the negative electrode, and the corner portion of the active material-containing layer of the electrode having a smaller area is notched or chamfered. Therefore, when the electrode is deviated, or the corner portion of the electrode is deformed due to vibration or impact applied to the battery, it is possible to prevent the corner portion of the electrode from tearing the separator and prevent an internal short-circuit.

In the first to fifth embodiments, the width of at least one of the positive electrode current collector tab and the negative electrode current collector tab is preferably set as follows.

The width (L1 in FIGS. 4 and 7) of the positive electrode current collector tab 10 in the projecting direction is set to be greater than or equal to 4% and less than or equal to 28% of the width (L2 in FIGS. 4 and 7) of the positive electrode active material layer 10b parallel to the projecting direction. Since it is possible to increase a portion directly nipped from the case 1 by increasing the width of the positive electrode current collector tab 10a in the projecting direction, it is possible to further reduce internal resistance increase of the battery due to vibration or impact. From the viewpoint of internal resistance increase of the battery, it is advantageous to increase the width of the positive electrode current collector tab 10a in the projecting direction. However, if the width of the positive electrode current collector tab 10a is excessively large, the energy density by volume may be lowered.

Similarly, the width of the negative electrode current collector tab 11a in the projecting direction (L3 in FIGS. 4 and 8) is set to be greater than or equal to 3% and less than or equal to 20% of the width (L4 in FIGS. 4 and 8) of the negative electrode active material layer 11b parallel to the projecting direction. Since it is possible to increase a portion directly nipped from the case 1 by increasing the width of the negative electrode current collector tab 11a in the projecting direction, it is possible to reduce internal resistance increase of the battery due to vibration or impact. From the viewpoint of internal resistance increase of the battery, it is advantageous to increase the width of the negative electrode current collector tab 11a in the projecting direction. However, if the width of the negative electrode current collector tab 11a is excessively large, an energy density by volume may be lowered.

By defining the width of the positive electrode current collector tab 10a or the negative electrode current collector tab 11a in the projecting direction, it is possible to further improve the effect of improving internal resistance change of the battery. Therefore, it is preferable to define the widths of the current collector tabs of both the positive and negative electrodes in the projecting direction.

Hereinafter, the positive electrode, the negative electrode, the separator, and the electrolytic solution applicable to the first to fifth embodiments will be described.

The positive electrode is manufactured, for example, by coating a slurry containing a positive electrode active material on a current collector made of an aluminum foil or an aluminum alloy foil. The positive electrode active material may include, but not particularly limited to, oxides, sulfides, polymers, and the like capable of absorbing or releasing lithium. Preferably, the active material may include lithium manganese complex oxides, lithium nickel complex oxides, lithium cobalt complex oxides, lithium iron phosphates, and the like capable of obtaining a high positive electrode electric potential. Similarly, the negative electrode is manufactured by coating a slurry containing a negative electrode active material on a current collector made of an aluminum foil or an aluminum alloy foil. The negative electrode active material may include, but not particularly limited to, metal oxides, metal sulfides, metal nitrides, alloys, and the like capable of absorbing or releasing lithium. Preferably, the negative electrode active material is a substance having an electric potential for absorbing or releasing lithium ions of 0.4 V (vs Li/Li$^+$) or higher relative to the metal lithium electric potential. Since the negative electrode active material having such a lithium ion absorbing/releasing electric potential suppresses an alloy reaction between aluminum and lithium and an alloy reaction between aluminum alloy and lithium, aluminum or aluminum alloy can be used in the negative electrode current collector and elements relating to the negative electrode. For example, such a negative electrode active material may include titanium oxides, lithium titanium oxides, tungsten oxides, amorphous tin oxides, tin silicon oxides, silicon oxides, and the like. Preferably, the negative electrode active material includes lithium titanium complex oxides. The separator may be made of a microporous film, woven fabrics, non-woven fabrics, a stack of those materials or other materials, and the like. Materials of the separator may include polyethylene, polypropylene, ethylene-propylene copolymer, ethylene-butane copolymer, cellulose, and the like.

As the electrolytic solution, a nonaqueous electrolytic solution prepared by dissolving electrolyte (for example, lithium salts) into a nonaqueous solvent is used. The nonaqueous solvent may include, for example, ethylene carbonate (EC), propylene carbonate (PC), butylene carbonate (BC), dimethyl carbonate (DMC), diethyl carbonate (DEC), ethyl methyl carbonate (EMC), γ-butyrolactone (γ-BL), sulfolane, acetonitrile, 1,2-dimethoxyethane, 1,3-dimethoxypropane, dimethyl ether, tetrahydrofuran (THF), 2-methyl tetrahydrofuran, and the like. The aforementioned materials of the nonaqueous solvent may be used solely or as a combination of two or more materials described above. The electrolyte may include, for example, lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), and lithium trifluoromethanesulfonate ($LiCF_3SO_3$). The aforementioned materials of the electrolyte may be used solely or as a combination of two or more materials described above. A dissolving amount of the electrolyte with respect to the nonaqueous solvent is preferably set to 0.2 to 3 mol/L.

Although the nonaqueous electrolyte battery is employed in the embodiments, the embodiments is not limited thereto. The embodiments may be applicable to other types of batteries such as an alkaline battery. The number of electrode groups may be set to 1 or 2. In addition, the embodiments may be applicable to a battery pack comprising a single or a plurality of batteries according to the embodiment and a charge/discharge control circuit.

EXAMPLES

Hereinafter, examples will be described.

Example 1

A nonaqueous electrolyte battery having the structure illustrated in FIG. 1A was manufactured through the following method.

<Process of Manufacturing Positive Electrode>

A slurry was prepared by adding lithium cobalt oxides ($LiCoO_2$) powder as a positive electrode active material of 90 weight %, acetylene black of 3 weight %, graphite of 3 weight %, and polyvinylidene fluoride (PVdF) of 4 weight % to N-methyl pyrrolidone (NMP) and mixing them. This slurry was coated on both surfaces of a current collector made of aluminum with a thickness of 12 μm and was dried. Then, a press process was performed, so that a positive electrode 10 having a thickness of 58 μm was manufactured.

<Process of Manufacturing Negative Electrode>

A slurry was prepared by adding lithium titanium oxides ($Li_4Ti_5O_{12}$) powder as a negative electrode active material of 95 weight % having a spinel structure, acetylene black of 2.5 weight % as a conducting agent, polyvinylidene fluoride (PVdF) of 2.5 weight % to N-methyl pyrrolidone (NMP) solution and mixing them. This slurry was coated on both surfaces of a current collector made from an aluminum foil having a thickness of 12 μm and was dried. The, a press process was performed, so that a negative electrode 11 having a thickness of 44 μm was manufactured.

<Process of Manufacturing Electrode Group>

The obtained positive electrode 10 was cut in a strip shape such that a portion of the current collector where an active material-containing layer is not formed is positioned in one long side. A portion of the current collector where the active material-containing layer is not formed serves as the current collector tab 10a. A width L1 of the positive electrode current collector tab 10a in a short-side direction (projecting direction) was set to 14 mm, and a width L2 of the positive electrode active material layer 10b parallel to the short-side direction was set to 88 mm. Width L1 of the positive electrode current collector tab 10a was 15.9% of width L2 of the positive electrode active material layer 10b.

Similarly, the negative electrode 11 was cut in a strip shape such that a portion of the current collector where the active material-containing layer is not formed is positioned in one long side. A portion of the current collector where the active material-containing layer is not formed serves as a current collector tab 11a. A width L3 of the negative electrode current collector tab 11a in a short-side direction was set to 10 mm, and a width L4 of the negative electrode active material layer 11b parallel to short-side direction was set to 92 mm. Width L3 of the negative electrode current collector tab 11a was 10.9% of width L4 of the negative electrode active material layer 11b.

The positive electrode 10 and the negative electrode 11 were wound in a flat spiral shape by interposing the separator 12 made of a polyethylene porous film with a thickness of 20 μm therebetween. The positive electrode current collector tab 10a rolled in a spiral shape was made to project from one end face relative to the negative electrode 11 and the separator 12, and the negative electrode current collector tab 11a rolled in a spiral shape was made to project from the other end face relative to positive electrode 10 and the separator 12. The separator 12 was positioned in the outermost circumference of the electrode group 2. A portion of the positive electrode current collector tab 10a exposed from the separator 12 had width of 8 mm, and a portion of the negative electrode current collector tab 11a exposed from the separator 12 had a width of 8 mm.

After the winding, a compressive molding was performed, so that the electrode group 2 of FIG. 4 was obtained.

<Process of Connecting Positive and Negative Electrode Leads>

As the positive electrode lead 3 and the negative electrode lead 4, an aluminum foil having a thickness of 0.2 mm, a width of 30 mm, and a length of 50 mm was prepared. A part of the aluminum foil was covered by a polypropylene film with an acid-modification (having a thickness of 0.1 mm, a width of 38 mm, and a length of 12 mm) as a thermoplastic insulation film. The positive electrode lead 3 and the negative electrode lead 4 were connected to the positive electrode current collector tab 10a and the negative electrode current collector tab 11a, respectively, through ultrasonic welding.

<Process of Cup-Molding of Case>

Cup-molding was performed for the case made of a laminate film with a thickness of 0.11 mm using a press mold comprising a male mold having a size of 95 mm by 96 mm. The laminate film has a layered structure comprising nylon, aluminum and cast-polypropylene. Then, the first and second films were obtained by cutting excessive margins such that an exterior size becomes 140 mm by 120 mm, a width of edge portions 5a and 6b in the positive electrode lead side becomes 21.5 mm, a width of the edge portions 5a and 6b in the negative electrode lead side becomes 19.5 mm, widths of other portions (without the lead) become 10 mm.

<Process of Preparing Nonaqueous Electrolytic Solution>

A nonaqueous electrolytic solution was prepared by dissolving lithium hexafluorophosphate ($LiPF_6$) at a concentration of 1.0 mol/L to a mixing solvent of ethylene carbonate (EC) and methyl ethyl carbonate (MEC) (mixing volume ratio=1:2).

<Process of Injecting and Sealing Nonaqueous Electrolytic Solution>

After the electrode group 2 is housed in the first convex portion 5 of the first film of the case 1, the electrode group was enveloped with the first and second convex portions 5 and 6 by overlapping the edge portions 5a and 6a of the first and second films each other. The positive electrode current collector tab 10a was arranged in one of four sides formed by overlapping the edge portions 5a and 6a of the first and second films each other, and an end portion of the positive electrode lead 3 was made to extend outwardly through this one side. The negative electrode current collector tab 11a was arranged in the side opposite to this one side, and an end portion of the negative electrode lead 4 was made to extend outwardly through this opposite side. The extending direction of the negative electrode lead 4 was opposite to that of the positive electrode lead 3. A part of the positive electrode current collector tab 10a from the end face to 8.5 mm was arranged between the edge portions 5a of the first film and the edge portion 6a of the second film. In addition, a part of the negative electrode current collector tab 11a from the end face to 6.5 mm was arranged between the edge portion 5a of the first film and the edge portion 6a of the second film.

Then, the edge portions 5a and 6a in a pair of sides through which the positive and negative electrode leads 3 and 4 are extended and one of a pair of sides where the positive and negative electrode leads 3 and 4 do not extend were bonded through heat sealing under an atmospheric pressure. Then, the nonaqueous electrolyte was injected into the case from a gap between the edge portions 5a and 6a in the remaining one side where heat sealing is not performed, so that the nonaqueous electrolytic solution was impregnated into the electrode group.

Then, the edge portions 5a and 6a in the one side used to inject the electrolytic solution were bonded through heat sealing with a sealing width of 10 mm under a depressurized atmosphere of 11.3 kPa to seal the case, so that the lithium ion secondary battery having a structure of FIG. 1A was obtained.

Example 2

The positive and negative electrode leads 3 and 4 were connected to the electrode group 2 through ultrasonic welding. Then, in the positive electrode current collector tabs 10a in both sides of the connecting portion C for the positive electrode lead 3, the positive electrode current collector tabs 10a were connected to each other through ultrasonic welding, so that the first current collector tab connecting portion D was formed. Similarly, in the negative electrode current collector tabs 11a in both sides of the connecting portion C for the negative electrode lead 4, the negative electrode current collector tab 11a were connected through ultrasonic welding, so that the second current collector tab connecting portion D was formed. The connecting area was set to 12 mm by 2.4 mm.

Similar to Example 1, the lithium ion secondary battery of FIG. 5 was obtained except that the first and second current collector tab connecting portions D are provided.

Example 3

Similar to Examples 1 and 2, the positive and negative electrode leads were connected, and the first and second current collector tab connecting portions D were formed for the coil type electrode group obtained as described in Example 1. Then, an insulation tape (having a width of 10 mm and a length of 98 mm) made of polypropylene was adhered onto the positive electrode current collector tab 10a and the negative electrode current collector tab 11a adjoining an inner surface of the case 1. Subsequently, similar to Example 1, a process of injecting a nonaqueous electrolytic solution and sealing was performed, so that a lithium ion secondary battery having the structure of FIG. 6 was obtained.

Example 4

A stack type electrode group was manufactured as follows by employing the positive electrode, the negative electrode, and the separator manufactured through the method of Example 1.

As illustrated in FIG. 7, the positive electrode 10 was cut into a size of 89 mm by 102 mm in a strip-like shape such that a part of the current collector (current collector tab 10a) where the active material-containing layer is not formed is positioned in one short side. A width L1 of the positive electrode current collector tab 10a in the short-side direction (projecting direction) was set to 14 mm, and a width L2 of the positive electrode active material layer 10b parallel to the short-side direction was set to 88 mm. Width L1 of the positive electrode current collector tab 10a was 15.9% of width L2 of the positive electrode active material layer 10b.

Similarly, as illustrated in FIG. 8, the negative electrode 11 was cut into a size of 93 mm by 102 mm in a strip-like shape such that a part of the current collector (current collector tab 11a) where the active material-containing layer is not formed is positioned in one short side. A width L3 of the negative electrode current collector tab 11a in the short-side direction (projecting direction) was set to 10 mm, and a width L4 of the negative electrode active material layer 11b parallel to the short-side direction was set to 92 mm. Width L3 of the negative electrode current collector tab 11a was 10.9% of width L4 of the negative electrode active material layer 11b.

The electrode group 2 was obtained by alternately stacking the positive electrode 10, the negative electrode 11, and the separator 12 interposed therebetween, projecting the positive electrode current collector tab 10a from one end face relative to the negative electrode 11 and the separator 12, and projecting the negative electrode current collector tab 11a from the other end face relative to the positive electrode 10 and the separator 12. The separator 12 was positioned in the outermost layer of the electrode group 2. A part of the positive electrode current collector tab 10a exposed from the separator had a width of 8 mm, and a part of the negative electrode current collector tab 11a exposed from the separator had a width of 8 mm.

Similar to Examples 1 and 2, the positive and negative electrode leads were connected, and the first and second current collector tab connecting portions D were formed in the obtained electrode group. Then, as illustrated in FIG. 10, each corner portion of the positive electrode current collector tab 10a and the negative electrode current collector tab 11a was C-chamfered. Subsequently, a polypropylene insulation tape (having a width of 10 mm and a length of 98 mm) was adhered onto the positive electrode current collector tab 10a and the negative electrode current collector tab 11a adjoining an inner surface of the case 1. Then, similar to Example 1, a process of injecting the nonaqueous electrolytic solution and sealing was performed, so that a lithium ion secondary battery having the structure of FIG. 9 was obtained.

Example 5

In the lithium ion secondary battery manufactured as described in Example 4, the corner portion 15 of the active material-containing layer 10a of the positive electrode 10 having an area smaller than that of the negative electrode 11 was chamfered, so that a lithium ion secondary battery having the structure of FIG. 11 was obtained.

Comparative Example

Figure 12A:
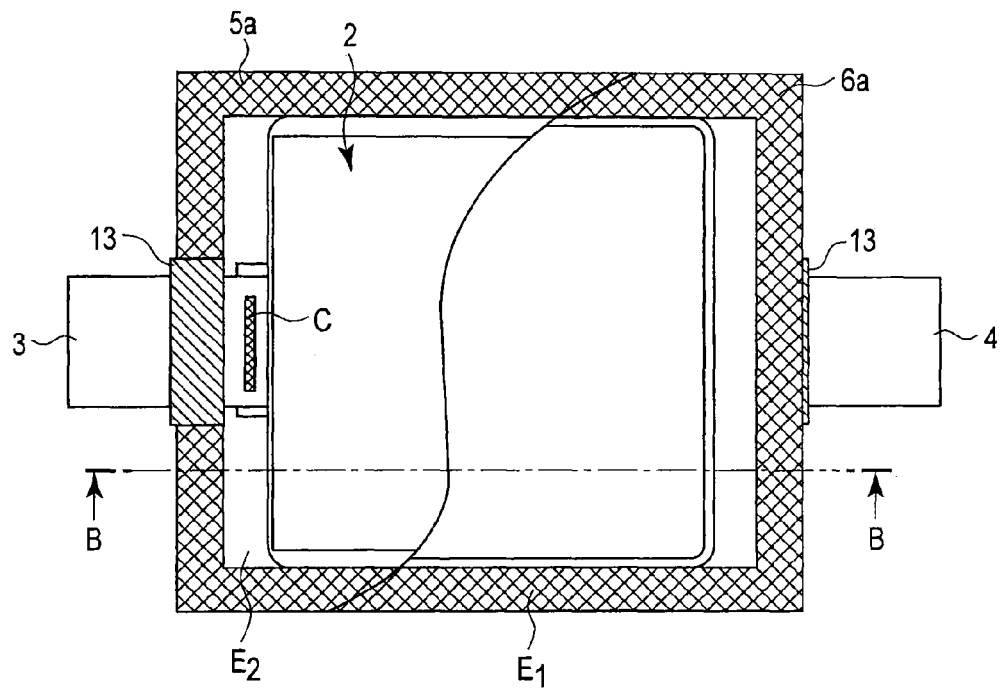
FIG. 12A is a plan view schematically illustrating a battery according to Comparative Example.
Figure 12B:
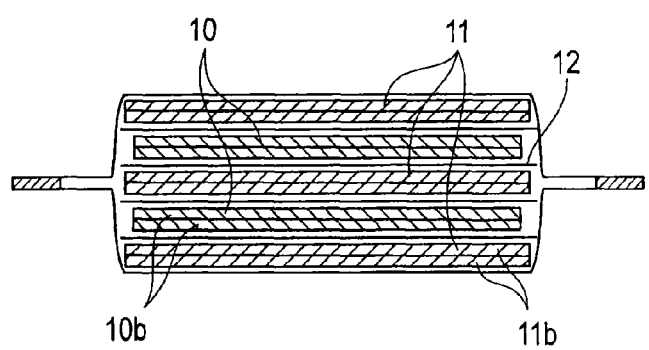
FIG. 12B is a cross-sectional view obtained by cutting the battery of FIG. 1A along a line B-B.

A lithium ion secondary battery having the structure of FIG. 12 was manufactured through the following method.

Stamping was performed for the positive and negative electrode current collector tabs 10a and 11a of the positive and negative electrodes 10 and 11 manufactured in Example 4 while only the connecting portions for the positive and negative electrode leads remain. The electrode group 2 was obtained by alternately stacking the positive electrode 10, the negative electrode 11, and the separator 12 interposed therebetween, projecting the positive electrode current collector tab 10a from one end face relative to the negative electrode 11 and the separator 12, and projecting the negative electrode current collector tab 11a from the other end face relative to the positive electrode 10 and the separator 12. A portion of the positive electrode current collector tab 10a exposed from the separator had a width of 8 mm, and a portion of the negative electrode current collector tab 11a exposed from the separator had a width of 8 mm.

The positive and negative electrode leads 3 and 4 similar to those of Example 1 were connected to the positive and negative electrode current collector tabs 10a and 11a through ultrasonic welding. In FIG. 12A, the connecting portions were denoted by reference symbol "C".

In the cup-molding process for the case, cup-molding was performed using a press mold having a male mold having a size of 95 mm by 96 mm. As the electrode group is housed in the obtained case, the connecting portion C for the positive and negative electrode leads 3 and 4 out of the positive and negative electrode current collector tabs 10a and 11a was interposed between the edge portions 5a and 6a of the case 1, but other portions were positioned and housed in the case portion of the case 1.

Then, the edge portions 5a and 6a in a pair of sides where the positive and negative electrode leads 3 and 4 are extended and one of a pair of sides where the positive and negative electrode leads 3 and 4 do not extend were connected through heat sealing under an atmospheric pressure. Then, the nonaqueous electrolytic solution was injected into the case from a gap between the edge portions 5a and 6a in the remaining one side where heat sealing is not performed, so that the nonaqueous electrolytic solution was impregnated into the electrode group.

Then, the case was sealed by bonding the edge portions 5a and 6a in the one side used to inject the electrolytic solution with a sealing width of 10 mm through heat sealing under a depressurized atmosphere of 11.3 kPa, so that a lithium ion secondary battery having the structure of FIG. 12A was obtained.

In the battery obtained in Comparative Example, connecting portions between the positive and negative electrode current collector tabs 10a and 11a and the positive and negative electrode leads 3 and 4 are interposed between the edge portions 5a and 6a of the case 1, and other remaining portions of the electrode group 2 are housed in the case portion 5.

Measurement

Ten samples of the lithium ion secondary battery were prepared for each of Examples 1 to 5 and Comparative Example described above. A charging operation at a constant voltage of 2.8 V and a constant current of 3 A for an hour and a discharging operation up to a voltage of 1.5 V at a constant current of 3 A were repeatedly performed three times, so that a discharge capacity was measured. Then, the battery was charged up to a full charge condition under the aforementioned charging condition, and a 50% charge condition was set by discharging the battery up to 50% of the discharge capacity at a constant current of 3 A.

Then, a vibration durability test was performed by repeatedly applying vibration at an acceleration of 12 G along each of the X-, Y-, and Z-axis directions for 3 hours. A battery internal resistance at a frequency of 1 kHz was measured before and after the test. Table 1 shows the highest internal resistances of the lithium ion secondary batteries after the test performed for each of the batteries obtained in Examples 1 to 5 and Comparative Example. In addition, out of the batteries of Examples 1 to 5 and Comparative Example, the battery having the highest internal resistance after the test was disassembled, and it was observed whether or not there is a crack or fracture in the positive and negative electrode current collector tabs. The result thereof is also provided in Table 1.

TABLE 1

| | | | Electric property/battery internal resistance (cell having maximum value after test) | | Removal and observation | |
|---|---|---|---|---|---|---|
| | Positions of positive and negative electrode current collector tabs | Current collector tab connecting portion D | Initial value | Value after test | Crack in current collector tab | Fracture in current collector tab |
| Example 1 | Between edge portions of first and second films | Absent | 1.06Ω | 1.35Ω | Absent | Absent |
| Example 2 | Between edge portions of first and second films | Present | 1.08Ω | 1.27Ω | Absent | Absent |
| Example 3 | Between edge portions of first and second films | Present | 1.08Ω | 1.29Ω | Absent | Absent |
| Example 4 | Between edge portions of first and second films | Present | 1.07Ω | 1.29Ω | Absent | Absent |

TABLE 1-continued

| | Positions of positive and negative electrode current collector tabs | Current collector tab connecting portion D | Electric property/battery internal resistance (cell having maximum value after test) | | Removal and observation | |
|---|---|---|---|---|---|---|
| | | | Initial value | Value after test | Crack in current collector tab | Fracture in current collector tab |
| Example 5 | Between edge portions of first and second films | Present | 1.08Ω | 1.30Ω | Absent | Absent |
| Comparative Example | Inside case portion | Absent | 1.08Ω | 5.12Ω | Present | Present |

As recognized from Table 1, while the internal resistance of the battery obtained in Comparative Example after the test increases approximately 5 times, the internal resistances of the batteries obtained in Examples 1 to 5 do not remarkably increase. Therefore, it is recognized that the lithium ion secondary batteries according to the embodiments have high durability against vibration or impact.

In Examples 1 to 5 and Comparative Example, the lithium ion secondary battery having the highest internal resistance was disassembled and observed. For the lithium ion secondary battery of Comparative Example, it was observed that there is a fracture or crack in the positive and negative electrode current collector tabs 10a and 11a in the connecting portions between the positive and negative electrode leads 3 and 4 and the positive and negative electrode current collector tabs 10a and 11a. For this reason, it is recognized that the internal resistance of the battery obtained in Comparative Example remarkably increases.

It is considered that this is because, in the battery of Comparative Example, the connecting portions between the positive and negative electrode current collector tabs 10a and 11a and the positive and negative electrode leads 3 and 4 are interposed between the edge portions 5a and 6a of the case 1, and other remaining portions of the electrode group 2 are housed in the case portion, so that the electrode group 2 easily moves in the case portion during the vibration test, that is, position of the electrode group 2 inside the case portion is deviated, and a stress is concentrated on the connecting portions between the positive and negative electrode current collector tabs 10a and 11a and the positive and negative electrode leads 3 and 4, destroying the electrical connecting.

In Examples 1 to 5, no fracture or crack was found in the current collector tabs unlike Comparative Example.

It is considered that this is because, in the lithium ion secondary batteries of Examples 1 to 5, the width of the end portion in a direction perpendicular to the projecting direction of the positive and negative electrode current collector tabs is larger than the width of the positive and negative electrode leads, the positive and negative electrode current collector tabs in portions other than the connecting portions of the positive and negative electrode leads are directly interposed between the films of the case through sealing under a depressurized or vacuumized condition, and an atmospheric pressure is applied from the outside of the case, so that a movement of the electrode group inside the case portion of the case is suppressed, and a stress applied to the connecting portion between the current collector tabs and the leads is alleviated.

In the battery according to at least any one of the embodiments and Examples described above, at least one end portion of the positive and negative electrode current collector tabs is interposed between the edge portions of the case where heat sealing is not performed. Therefore, it is possible to suppress a crack or fracture in the current collector tab when vibration or impact is applied to the battery and suppress internal resistance increase of the battery.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A battery comprising:
an electrode group comprising
a positive electrode comprising an active material-containing layer,
a negative electrode comprising an active material-containing layer,
a separator provided between the positive and negative electrodes,
at least one positive electrode current collector tab that projects from one end portion of the electrode group, and
at least one negative electrode current collector tab that projects from the other end portion of the electrode group;
a case comprising a case portion where the electrode group is housed and an edge portion provided at a circumference of the case portion, the edge portion comprising a heat sealed part and a non-sealed part, the heat sealed part comprising a bonding portion where sealant layers are bonded to each other through heat sealing;
a positive electrode lead electrically connected to an end portion of the at least one positive electrode current collector tab such that an end portion extends outwardly through the edge portion of the case; and
a negative electrode lead electrically connected to an end portion of the at least one negative electrode current collector tab such that an end portion extends outwardly through the edge portion of the case,
wherein the electrode group is housed in the case portion while the end portion of at least one of the positive electrode current collector tab and the negative electrode current collector tab is directly nipped by the non-sealed part of the edge portion of the case forming a nipped portion, wherein the negative electrode current collector tab and positive electrode current collector tab are only contained in the nipped portion.

2. The battery according to claim 1, wherein the heat sealed part is produced under a depressurized or vacuumized condition, after an electrolytic solution injection.

3. The battery according to claim 1, wherein an extending direction of the positive electrode lead is opposite to an extending direction of the negative electrode lead.

4. The battery according to claim 3, wherein a plurality of positive electrode current collector tabs project from the one end portion of the electrode group and are electrically connected to each other.

5. The battery according to claim 3, wherein a plurality of negative electrode current collector tabs project from the other end portion of the electrode group and are electrically connected to each other.

6. The battery according to claim 3, wherein a plurality of positive electrode current collector tabs project from the one end portion of the electrode group and are electrically connected to each other, and a plurality of negative electrode current collector tabs project from the other end portion of the electrode group and are electrically connected to each other.

7. The battery according to claim 3, wherein an insulation member is interposed between an inside of the case and the end portion of at least one of the positive electrode current collector tab and the negative electrode current collector tab.

8. The battery according to claim 7, wherein the separator is positioned in an outermost layer of the electrode group, and the insulating material is coated from an end portion of the separator to the end portion of at least one of the positive electrode current collector tab and the negative electrode current collector tab.

9. The battery according to claim 7, wherein a corner portion in the end portion of at least one of the positive electrode current collector tab and the negative electrode current collector tab is notched or chamfered.

10. The battery according to claim 3, wherein an area of the active material-containing layer of the positive electrode is different from an area of the active material-containing layer of the negative electrode, and a corner portion in the active material-containing layer having a smaller area is notched or chamfered.

11. The battery according to claim 3, wherein the case is formed from an aluminum-containing laminate film.

12. The battery according to claim 3, wherein the battery is a lithium ion secondary battery.

13. The battery according to claim 11, wherein the end portion of at least one of the positive electrode current collector tab and the negative electrode current collector tab is directly nipped between aluminum-containing laminate films of the non-sealed part of the edge portion.

14. The battery according to claim 11, wherein the aluminum-containing laminate film comprises the sealant layer which forms an inner surface of the case, the end portion of at least one of the positive electrode current collector tab and the negative electrode current collector tab is directly nipped between sealant layers of the non-sealed part of the edge portion.

* * * * *